Patented July 30, 1935

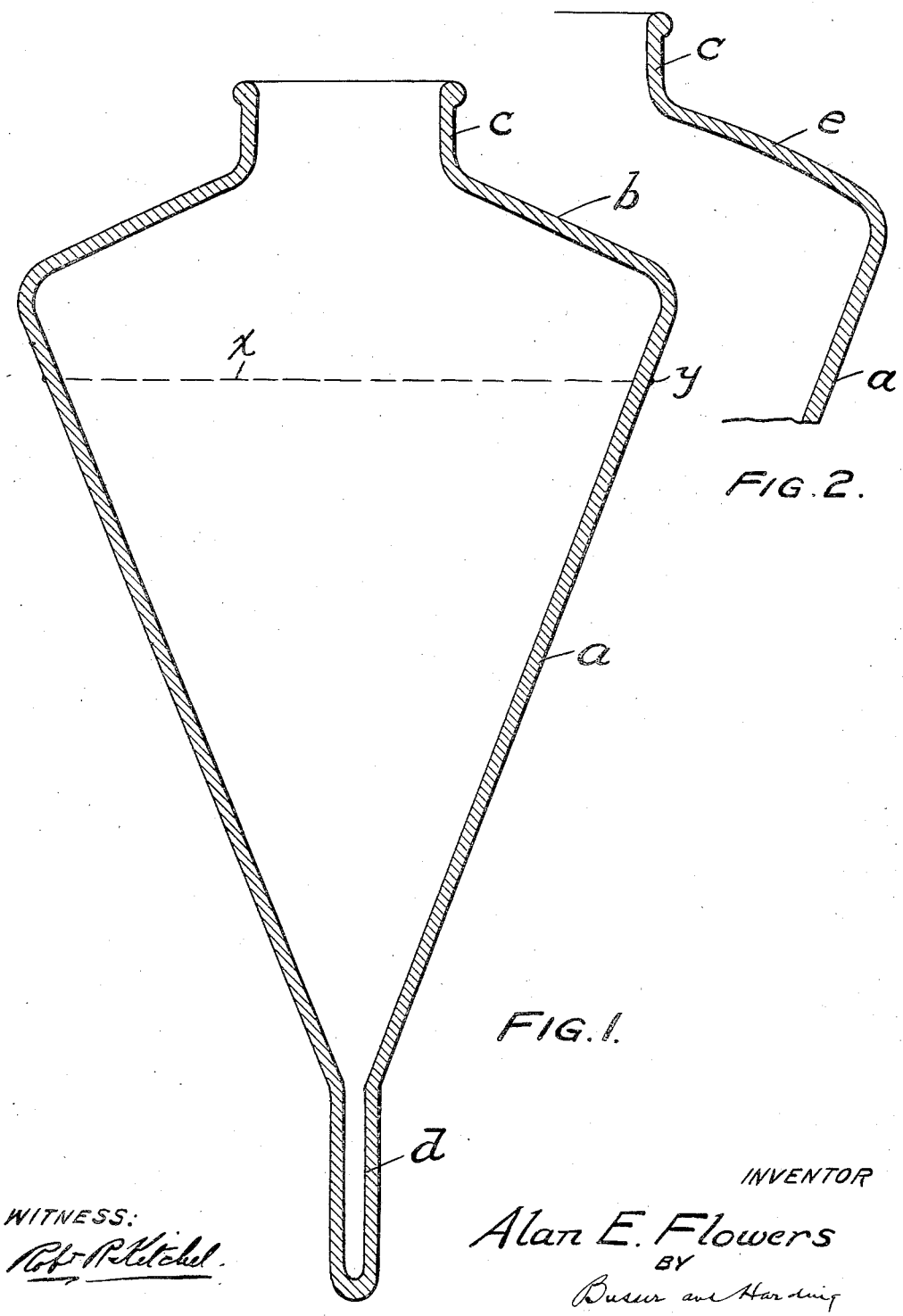

2,009,690

UNITED STATES PATENT OFFICE 2,009,690

CENTRIFUGE TUBE

Alan E. Flowers, Poughkeepsie, N. Y., assignor to The De Laval Separator Company, New York, N. Y., a corporation of New Jersey Application November 14, 1932, Serial No. 642,499

7 Claims. (Cl. 233—26)

My invention is an improved form of tube for holding a small quantity of liquid while it is subjected to high centrifugal force to separate it into its constituents of different specific gravities.

The object of my invention is to provide a tube that is better able to withstand the stresses set up by high centrifugal force and that is more convenient to work with.

The tubes most commonly used before my invention consist of a cylindrical body with a tapered lower portion having a length approximately twice the diameter of the cylindrical body. The opening at the top is sometimes the full diameter of the body and sometimes much smaller but in either case, if the tube be laid on its side, a large part or all of the contents will spill out. Attempts have been made to use corks in the top openings, but they are liable to be blown out by gas pressure due to heat used to render the liquids less viscous or even due to the heat generated by the rapid motion, sometimes as fast as four or five miles per minute, through air in a confined space. This necessitates that the cups that hold the tubes while they are rotated be so mounted that they can approach a perpendicular position when the machine comes to rest.

The described shape, namely, a cylindrical body with a tapered lower portion, of the tubes heretofore most commonly used is such that bursting forces can be counterbalanced only by floating the tube in a heavy liquid, usually glycerine or a solution of some salt, filling the space between the tube and the containing cup.

Another known centrifuge tube is the "pear shaped" tube, which has a frustroconical body with an included angle less than the angle of repose and a hemispherical top but so small as to spill when laid on its side. When rotated at high speed this tube is liable to slide down inside of a cushion until the external pressure becomes so great as to crush it.

By making the entire charge-containing body of the tube substantially a frustrum of a cone with an angle greater than the angle of repose and by providing above this a top portion that may be hemispherical or a reversed wider frustrum or some intermediate form, any of which have a narrow neck, I have found it possible to provide a tube which may be laid on its side without spilling and which, without the use of any flotation liquid, may be adequately supported in a metal cup by a properly shaped cushion of rubber or similar material. Such a cushion forms the subject-matter of another application, Serial No. 626,037, filed by me July 29, 1932.

Fig. 1 is a view in longitudinal section of a tube embodying my invention. Fig. 2 is a partial view of a modified tube.

In Fig. 1 the tube body, throughout the greater portion (a) of its length, has a conical shape and throughout the remainder (b) of its length adjacent the wide end of the cone is of the shape of a reversed wide angle frustrum of a cone with a reduced cylindrical neck c. The angle between the two conical sections is rounded. The sharply reduced admission end of the tube body need not be, strictly speaking, of the shape of a frustrum of a cone, but should approximate thereto, even though it be a section of a sphere e as shown in Fig. 2. The closed end of the tube may end with the apex of the cone, but much preferably is provided with a cylindrical tubular end d of small diameter.

In the operation of the bottle centrifuge, it is not customary to completely fill the tubes. It is standard practice to fill the tubes to a definite level. Usually the volume of contained liquid is from 50 to 60 percent of the tube capacity. In Fig. 1, x represents the liquid level when the tube, containing the standard charge, is placed upright on its reduced closed end. To indicate this standard liquid level the tube is provided with a mark y. The minimum angle of inclination of the wall of the main cone a to the axis of the cone obviously varies with the factors of ratio of liquid volume to tube capacity, volume of the reversed wide angle conical portion relative to the main conical portion, and diameter of charging neck. The main conical portion should be of a size to hold not less than 120% of the entire charge of liquid. The length of the reversed wide angle conical or curved wall portion should not be much over 23 to 25%, and preferably is about 18%, of the length of the main conical portion. The diameter of the neck should not exceed one-third of the maximum diameter of the tubular body at the junction of the two conical portions and should not exceed 28%, and preferably should be somewhat less than 23%, of the length of the main conical portion. The total included angle of the main conical portion should not be less than about 38°.

As a specific example of dimensions, the main conical portion a may be of a length of 44 mm., the length of the reversed wide angle conical portion (including the curved wall uniting the two cones and the neck) may be of a length of 8 mm., the neck may have a diameter of 10 mm. and the maximum width of the tube body may be nearly 34 mm. The total included angle of the main cone is 42° 22'. The normal liquid charge will have a depth, in the main conical portion, when the tube is placed upright, of about 40 mm.

What I claim and desire to protect by Letters Patent is:

1. A centrifuge tube comprising a lower substantially cylindrical small diameter stem, an intermediate substantially frustro-conical portion including most of the entire volume of the tube and adapted to contain more than the entire charge, and adjacent thereto an upper sharply contracted portion having a small diameter neck.

2. A centrifuge tube comprising a lower substantially cylindrical portion, an intermediate substantially frustro-conical charge-carrying portion including most of the entire volume of the tube and adapted to contain more than the entire charge, and adjacent thereto a sharply contracted small necked upper portion, the total included volume of the cone and contracted portion being such as to hold, without overflow, that part of a standard charge which is displaced from the intermediate portion when the tube is laid on its side on a horizontal surface.

3. A centrifuge tube comprising a lower substantially cylindrical small diameter portion, an intermediate substantially frustro-conical portion including most of the entire volume of the tube and having an included angle not less than the angle of repose and having a length to hold more than the entire standard liquid charge, and adjacent thereto an indrawn small-necked upper portion, said tube being capable of holding, without overflow, all that portion of the liquid charge displaced from the intermediate portion when the tube is laid on its side on a horizontal surface.

4. A centrifuge tube having a frustro-conical charge-carrying body portion including most of the entire volume of the tube and adapted to contain more than the entire charge, with an included angle greater than the angle of repose.

5. A centrifuge tube comprising a substantially frustro-conical body portion including most of the entire volume of the tube and adapted to contain more than the entire charge, and adjacent thereto an upper sharply contracted portion having a small diameter neck, the included angle of the cone and the total included volume of the tube being such as to hold, without overflow, a charge of liquid equal to sixty percent of the tube capacity when the tube is laid on its side on a horizontal surface.

6. A centrifuge tube comprising a substantially frustro-conical charge-carrying body portion including most of the entire volume of the tube and adapted to contain more than the entire charge, having a mark thereon to indicate the volume of a standard charge, and adjacent thereto a sharply contracted small-necked upper portion, the total included volume of the tube and the included angle of the cone being such as to hold, without overflow, the whole standard charge when the tube is laid on its side on a horizontal surface.

7. A centrifuge tube comprising a lower substantially cylindrical small diameter stem, an upper neck of multiple times the diameter of the stem, a short broadly expanded portion adjacent the neck, and a relatively long frustro-conical portion extending from said short expanded portion to the top of the stem, said tube at the junction of said expanded and frustro-conical portions having a maximum diameter multiple times that of the neck.

ALAN E. FLOWERS.